(12) United States Patent
Kim

(10) Patent No.: US 6,794,228 B2
(45) Date of Patent: Sep. 21, 2004

(54) TRANSFLECTIVE LIQUID CRYSTAL DISPLAY DEVICE AND FABRICATING METHOD THEREOF

(75) Inventor: Hong-Jin Kim, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/607,203

(22) Filed: Jun. 27, 2003

(65) Prior Publication Data

US 2004/0007704 A1 Jan. 15, 2004

(30) Foreign Application Priority Data

Jul. 15, 2002 (KR) .................................. 10-2002-0041289

(51) Int. Cl.[7] .............................................. H01L 21/00
(52) U.S. Cl. ..................... 438/149; 438/151; 438/128; 438/48
(58) Field of Search ................ 438/149, 151, 438/128, 48

(56) References Cited

U.S. PATENT DOCUMENTS 6,697,138 B2 * 2/2004 Ha et al. .................... 349/114

2002/0105604 A1 8/2002 Ha et al.
2002/0109797 A1 8/2002 Chung et al.

FOREIGN PATENT DOCUMENTS

KR    10 20000080501    6/2002

* cited by examiner

Primary Examiner—Luan Thai
(74) Attorney, Agent, or Firm—McKenna Long & Aldridge LLP

(57) ABSTRACT

An array substrate for a transflective liquid crystal display device includes: a gate line on a substrate; a data line crossing the gate line, the gate line and the data line defining a pixel region having a transmissive portion and a reflective portion; a gate electrode connected to the gate line; source and drain electrode spaced apart from each other over the gate electrode, the source and drain electrode being spaced apart from each other, the source electrode being connected to the data line; a reflective layer having the same layer as the source and drain electrodes, the reflective layer being disposed in the pixel region and having a transmissive hole corresponding to the transmissive portion; and a pixel electrode connected to the drain electrode, the pixel electrode being disposed in the pixel region, wherein the source and drain electrodes and the reflective layer have multiple layers of metal, wherein a top layer of the multiple layers includes a reflective metallic material.

13 Claims, 12 Drawing Sheets

TRANSFLECTIVE LIQUID CRYSTAL DISPLAY DEVICE AND FABRICATING METHOD THEREOF

This application claims the benefit of Korean Patent Application No. 2002-41289, filed on Jul. 15, 2002, which is hereby incorporated by reference for all purposes as if fully set forth herein.

BACKGROUND OF THE INVENTION

1. Field of the Invention

The present invention relates to a liquid crystal display device, and more particularly to a transflective liquid crystal display device and a fabricating method thereof by using a reduced number of masks.

2. Discussion of the Related Art

Liquid crystal display (LCD) devices are developed as next generation display devices because of their characteristics of light weight, thin profile, and low power consumption.

In general, an LCD device is a non-emissive display device that displays images utilizing optical anisotropy properties of liquid crystal materials that are interposed between a thin film transistor (TFT) array substrate and a color filter (C/F) substrate. Presently, among the various type of LCD devices commonly used, active matrix LCD (AM-LCD) devices in which thin film transistors (TFTs) are disposed in a matrix for each pixel region have been developed because of their high resolution and superiority in displaying moving images.

FIG. 1 is a schematic cross-sectional view of a liquid crystal display device according to the related art.

In FIG. 1, first and second substrates 2 and 4 are spaced apart and facing each other, and a liquid crystal layer 6 is interposed therebetween. A gate electrode 8 is formed on an inner surface of the second substrate 4 and a gate insulating layer 9 is formed on the gate electrode 8. A semiconductor layer 11 including an active layer 11a and an ohmic contact layer 11b is formed on the gate insulating layer 9 over the gate electrode 8. Source and drain electrodes 13 and 15 are formed on the semiconductor layer 11. The source and drain electrodes 13 and 15 are spaced apart from each other, and the active layer 11a corresponding to a space between the source and drain electrodes 13 and 15 functions as a channel "ch." The gate electrode 8, the semiconductor layer 11, and the source and drain electrodes 13 and 15 constitute a thin film transistor (TFT) "T." Even though not shown in FIG. 1, a gate line connected to the gate electrode 8 is formed along a first direction and a data line connected to the source electrode 13 is disposed along a second direction crossing the first direction. A pixel region "P" is defined by a cross of the gate line and the data line. A passivation layer 19 including a drain contact hole 17 is formed on the TFT "T" and a pixel electrode 21 connected to the drain electrode 15 through the drain contact hole 17 is formed in the pixel region "P."

A color filter layer 23 corresponding to the pixel electrode 21 is formed on an inner surface of the first substrate 2. The color filter layer transmits only light of a specific wavelength. A black matrix 27 is formed at a border between the adjacent color filter layers 23 to prevent a light leakage and an inflow of ambient light into the TFT "T." A common electrode 29 is formed on the color filter layer 23 and the black matrix 27 to apply a voltage to the liquid crystal layer 6. To prevent a leakage of the liquid crystal layer 6, a peripheral portion of the first and second substrates 2 and 4 is sealed with a seal pattern 31. A spacer 33 is disposed between the first and second substrates 2 and 4 to keep a uniform cell gap with the seal pattern 31. A first orientation film (not shown) can be formed between the common electrode 29 and the liquid crystal layer 6, and a second orientation film (not shown) can be formed between the liquid crystal layer 6 and the pixel electrode 21 to induce an alignment of the liquid crystal layer 6.

Even though not shown in FIG. 1, the LCD device includes a backlight unit under the second substrate 4 as a light source. However, the incident light from the backlight unit is attenuated during the transmission so that the actual transmittance is only about 7%. Accordingly, the backlight unit of the LCD device requires high brightness, thereby increasing power consumption by the backlight unit. Thus, a relatively heavy battery is required to supply a sufficient power to the backlight unit of such a device, and the battery cannot be used outdoors for a long period of time because of the increased power requirements.

In order to overcome the problems described above, a reflective LCD device and a transflective LCD device have been developed. The reflective LCD device uses the ambient light instead of light from the backlight unit, and thus it is light weight and easy to carry. In addition, power consumption of the reflective LCD device is reduced so that the reflective LCD device can be used for a portable display device such as an electronic diary or a personal digital assistant (PDA). In the reflective and transflective LCD devices, a reflective layer of a metallic material having a high reflectance is formed in a pixel region. The reflective layer can be formed in the pixel region over or under a transmissive electrode. More recently, the transmissive electrode is formed over the reflective layer to induce an alignment of the liquid crystal layer easily. Even with this structure, a transflective LCD having a multiple-layered insulating layer is suggested for protection of the reflective layer and to prevent an electrical short between the transmissive electrode and the reflective layer.

FIGS. 2A to 2G are schematic cross-sectional views showing a fabricating process of a display region of an array substrate for a transflective liquid crystal display device including a multiple-layered insulating layer according to the related art, and FIGS. 3A to 3G are schematic cross-sectional views showing a fabricating process of a non-display region of an array substrate for a transflective liquid crystal display device including a multiple-layered insulating layer according to the related art. Patterns on the array substrate are formed through a mask process including a deposition, a coating, a photolithography and an etching, and figures are shown according to a number of the mask process.

In FIGS. 2A and 3A, a gate electrode 10 and a first align key 12 of a first metallic material are formed on a substrate 4 through a first mask process.

In FIGS. 2B and 3B, after a gate insulating layer 14 of a first insulating material is formed on the gate electrode 10 and the first align key 12, a semiconductor layer 16 including an active layer 16a of amorphous silicon (a-Si) and an ohmic contact layer 16b of impurity-doped amorphous silicon (n+ a-Si) is formed on the gate insulating layer 14 over the gate electrode 10 through a second mask process.

In FIGS. 2C and 3C, source and drain electrodes 18 and 22 of a second metallic material are formed on the semiconductor layer 16 through a third mask process. The source and drain electrodes 18 and 22 are spaced apart from each other. At the same time, a data line 20 connected to the source electrode 18 is formed on the gate insulating layer 14, and a second align key 24 is formed on the gate insulating layer 14 over the first align key 12. The gate electrode 10, the semiconductor layer 16, and source and drain electrodes 18 and 22 constitute a thin film transistor (TFT) "T."

In FIGS. 2D and 3D, after first, second and third passivation layers 25, 26 and 28 are sequentially formed on the TFT "T" and the second align key 24, a first open portion 30 exposing the second align key 24 is formed in the first, second and third passivation layers 25, 26 and 28 through a fourth mask process. The first open portion 30 is for preventing the second align key 24 from being screened by the relatively thick second passivation layer 26. Thus, a mask for the fourth mask process can have a simpler structure than that of the previous first to third mask processes.

In FIGS. 2E and 3E, a reflective layer 32 of a third metallic material having a high reflectance is formed on the third passivation layer 28 over the TFT "T" through a fifth mask process. The reflective layer 32 has a second open portion 34 exposing the third passivation layer 28. In this step of forming the reflective layer 32, the second align key 24 is used for the fifth mask process. The first and third passivation layers 25 and 28 are made of silicon nitride (SiNx), and the second passivation layer 26 is made of benzocyclobutene (BCB). The first passivation layer 25 is formed to improve an electrical property of the TFT "T." The second passivation layer 26 is formed to reduce an electrical interference between the reflective layer 32 and a transmissive electrode (not shown). The third passivation layer 28 is formed to improve a contact property between the second passivation layer 26 and the reflective layer 32.

In FIGS. 2F and 3F, after a fourth passivation layer 36 is formed on the reflective layer 32 and the second align key 24, a drain contact hole 38 exposing the drain electrode 22 is formed in the first to fourth passivation layers 25, 26, 28 and 36 corresponding to the second open portion 34 through a sixth mask process. The fourth passivation layer 36 is made of the same material as the first and second passivation layers 25 and 28. The fourth passivation layer 36 is formed to prevent the Galvanic phenomenon (a corrosion phenomenon) between the reflective layer 32 and the transmissive electrode (not shown).

In FIGS. 2G and 3G, a transmissive electrode 40 of a transparent conductive material is formed on the fourth passivation layer 36 in a pixel region "P" through a seventh mask process. The transmissive electrode 40 is connected to the drain electrode 22 through the drain contact hole 38. The pixel region "P" includes a reflective portion corresponding to the reflective layer 32 and a transmissive portion. Images are displayed by using an ambient light in the reflective portion, while images are displayed by using light from the backlight unit (not shown) in the transmissive portion.

As shown in FIGS. 2A to 2G and FIGS. 3A to 3G, an array substrate for a transflective LCD device is formed through seven mask processes including a gate process, a semiconductor layer process, a data process, a reflective layer process, an align key open process, a contact hole process and a transmissive electrode process. Thus, the process of an array substrate for a transflective LCD device has more fabrication steps than that for a transmissive LCD device, and chemical and/or physical processes are repeated in the mask process. Therefore, as the fabrication steps increase, a fabrication cost and a possibility of damages to the device also increase.

SUMMARY OF THE INVENTION

Accordingly, the present invention is directed to a liquid crystal display device that substantially obviates one or more of the problems due to limitations and disadvantages of the related art.

An advantage of the present invention is to provide a transflective liquid crystal display device whose production yield is improved by reducing the number of mask processes.

An advantage of the present invention is to provide an array substrate for a transflective liquid crystal display device where source and drain electrodes has multiple layers of metallic material and an additional reflective layer is omitted.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a transflective liquid crystal display device may, for example, include a gate line on a substrate; a data line crossing the gate line, the gate line and the data line defining a pixel region having a transmissive portion and a reflective portion; a gate electrode connected to the gate line; source and drain electrode spaced apart from each other over the gate electrode, the source electrode being connected to the data line; a reflective layer having the same layer as the source and drain electrodes, the reflective layer being disposed in the pixel region and having a transmissive hole corresponding to the transmissive portion; and a pixel electrode connected to the drain electrode, the pixel electrode being disposed in the pixel region, wherein the source and drain electrodes and the reflective layer have multiple layers of metal, wherein a top layer of the multiple layers includes a reflective metallic material.

In another aspect of the present invention, a method of fabricating an array substrate for a transflective liquid crystal display device may, for example, include forming a gate electrode and a gate line on a substrate through a first mask process; forming a first insulating layer on the gate electrode and the gate line; forming a semiconductor layer on the first insulating layer over the gate electrode through a second mask process; forming source and drain electrodes on the semiconductor layer, a data line crossing the gate line, and a reflective layer on the first insulating layer through a third mask process, the source and drain electrodes being spaced apart from each other, the source electrode being connected to the data line, the gate line and the data line defining a pixel region having a transmissive portion and a reflective portion, the reflective layer being disposed in the pixel region and having a transmissive hole corresponding to the transmissive portion, the source and drain electrodes, the data line and the reflective layer having multiple layers of metal, a top layer of the multiple layers including a reflective metallic material; forming second insulating layer on the source and drain electrodes, the data line and the reflective layer through a fourth mask process, the second insulating layer having a drain contact hole exposing the drain electrode; and forming a pixel electrode on the third insulating layer through a fifth mask process, the pixel electrode including a transparent conductive material, the pixel electrode being connected to the drain electrode through the drain contact hole.

In yet another aspect of the present invention, a method of fabricating an array substrate for a transflective liquid crystal display device may, for example, include forming a gate electrode and a gate line on a substrate; forming a first insulating layer on the gate electrode and the gate line; forming a semiconductor layer on the first insulating layer, the semiconductor layer having an active layer and an ohmic contact layer; forming source and drain electrodes, a data line and a reflective layer having multiple layers on the first insulating layer at the same time, wherein the gate line and the data line defines a pixel region having a transmissive portion and a reflective portion, forming a pixel electrode of a transparent conductive material electrically connected to the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, example of which is illustrated in the accompanying drawings. Wherever possible, similar reference numbers will be used throughout the drawings to refer to the same or like parts.

Figure 1:
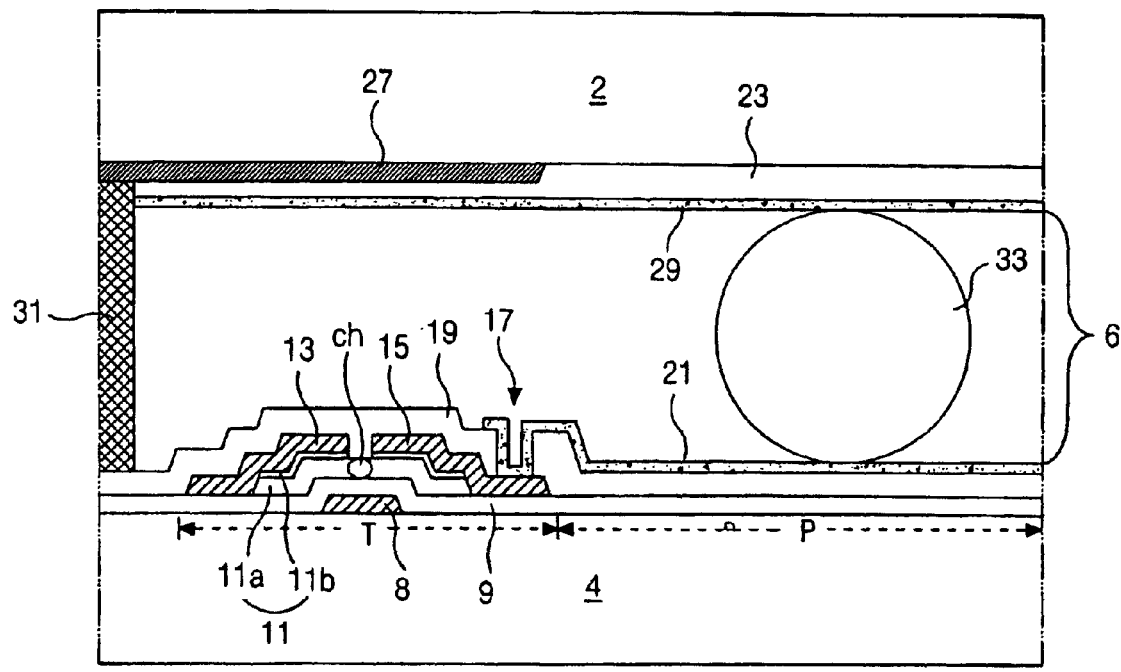
FIG. 1 is a schematic cross-sectional view of a liquid crystal display device according to the related art.
Figure 2A:
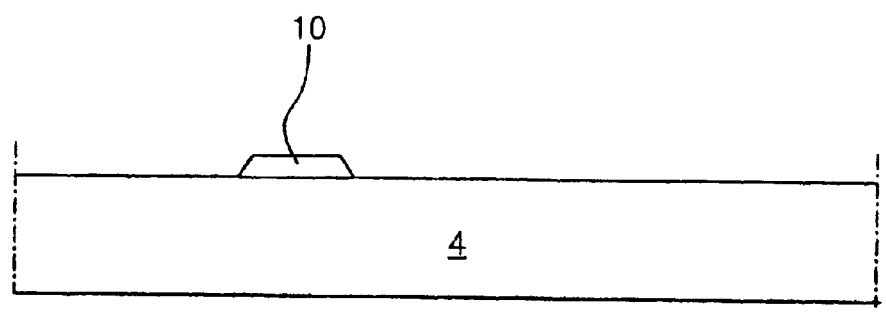
FIGS. 2A to 2G are schematic cross-sectional views showing a fabricating process of a display region of an array substrate for a transflective liquid crystal display device including a multiple-layered insulating layer according to the related art.
Figure 2B:
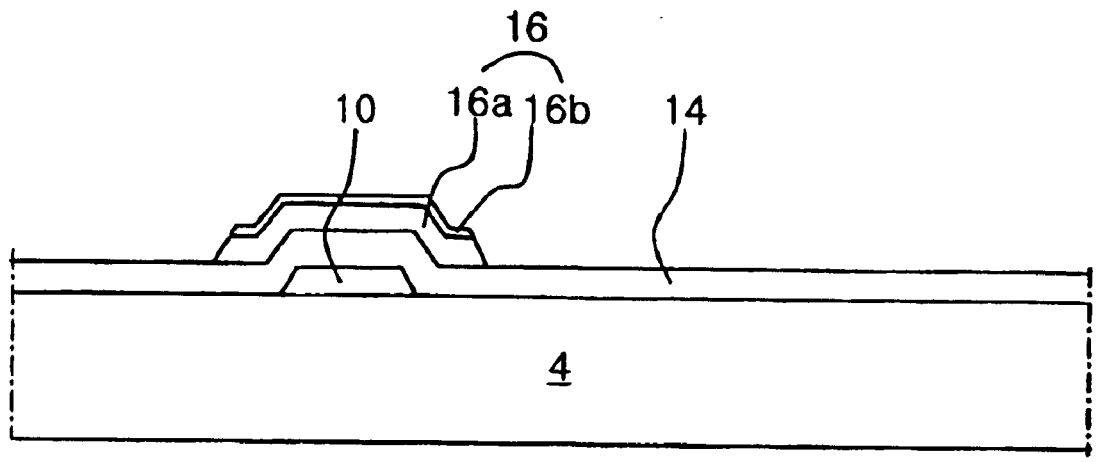
Figure 2C:
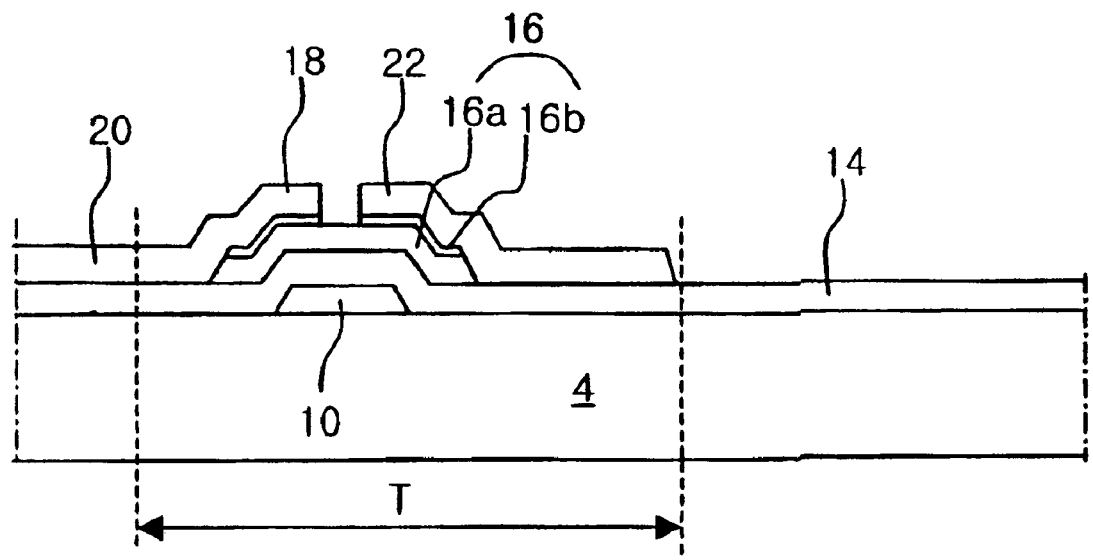
Figure 2D:
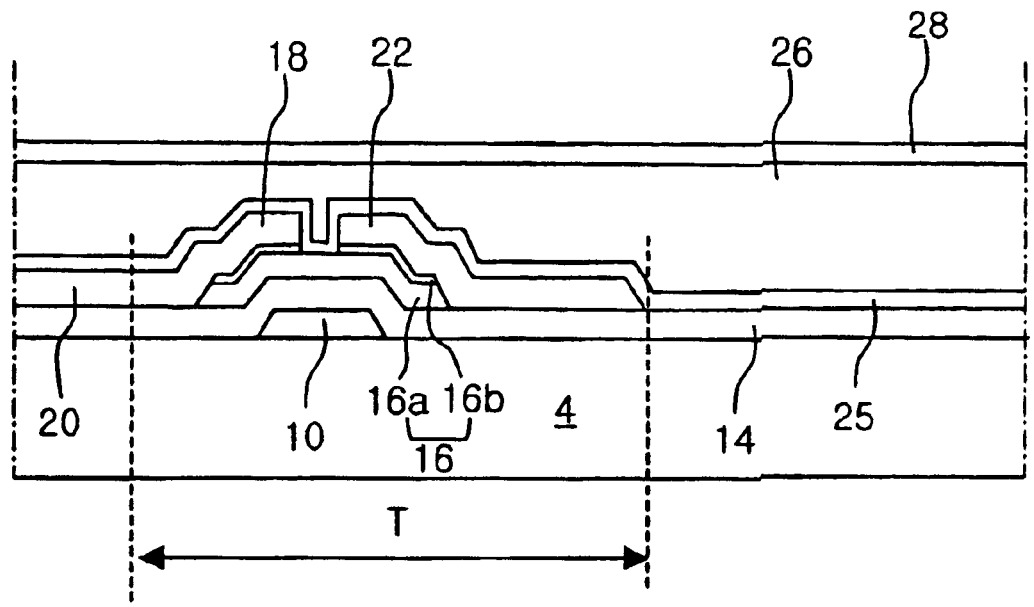
Figure 2E:
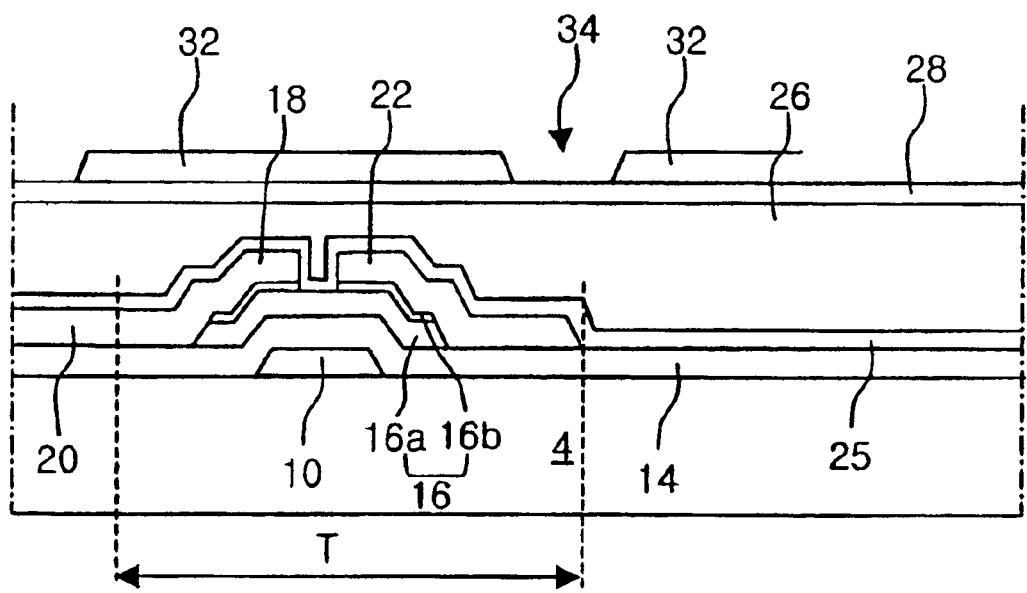
Figure 2F:
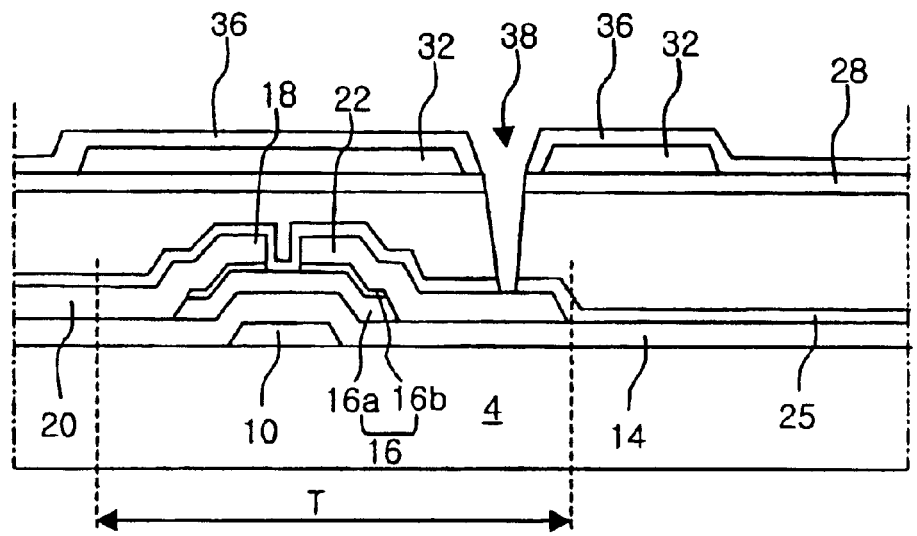
Figure 2G:
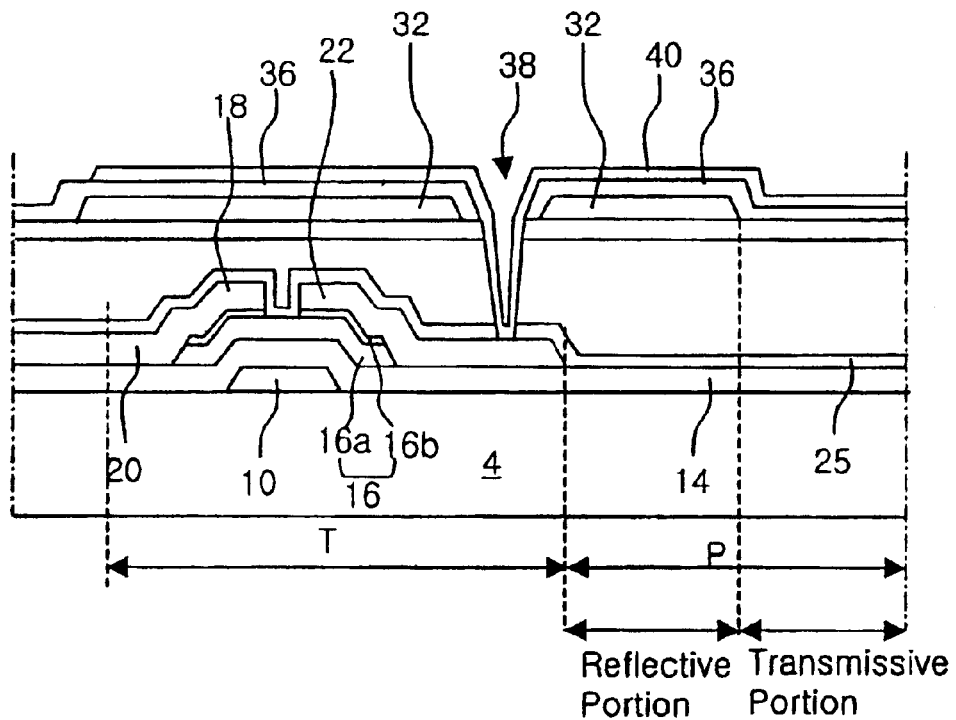
Figure 3A:
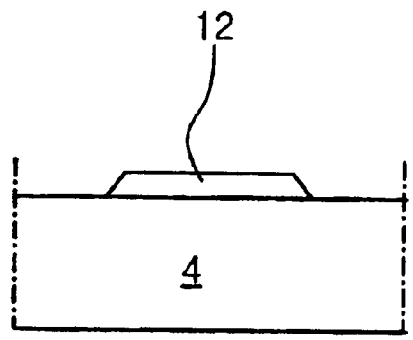
FIGS. 3A to 3G are schematic cross-sectional views showing a fabricating process of a non-display region of an array substrate for a transflective liquid crystal display device including a multiple-layered insulating layer according to the related art.
Figure 3B:
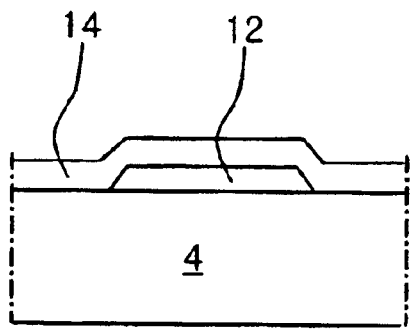
Figure 3C:
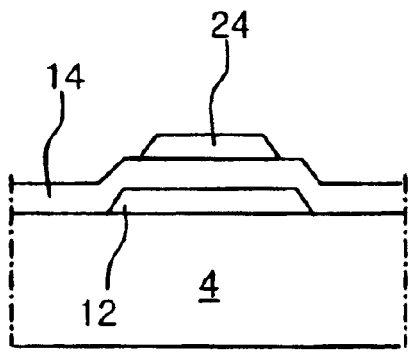
Figure 3D:
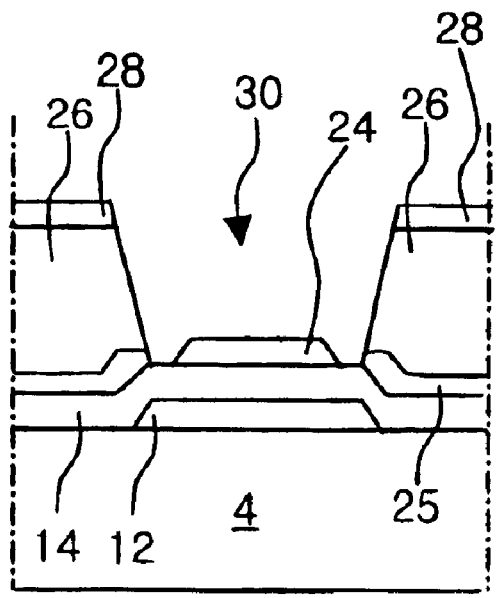
Figure 3E:
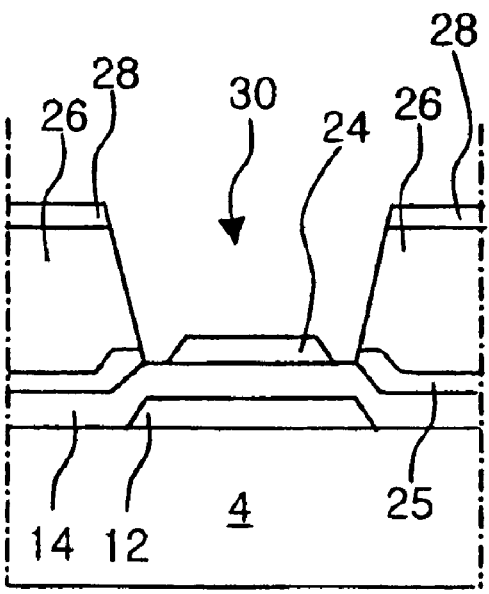
Figure 3F:
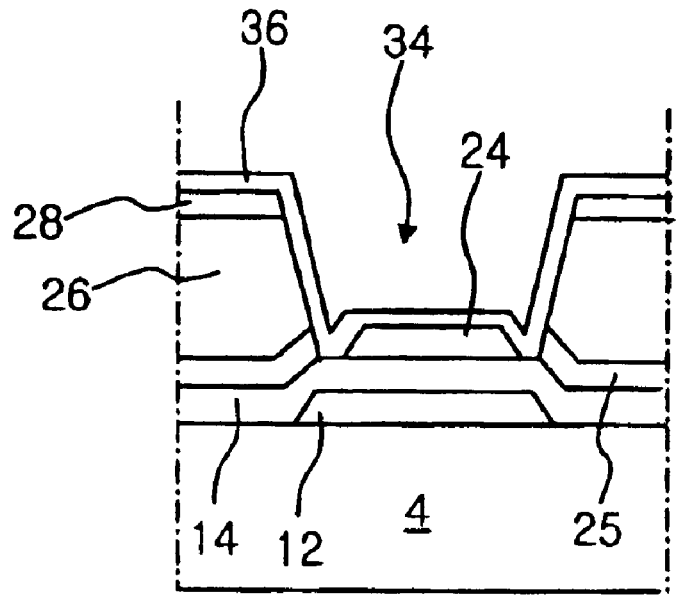
Figure 3G:
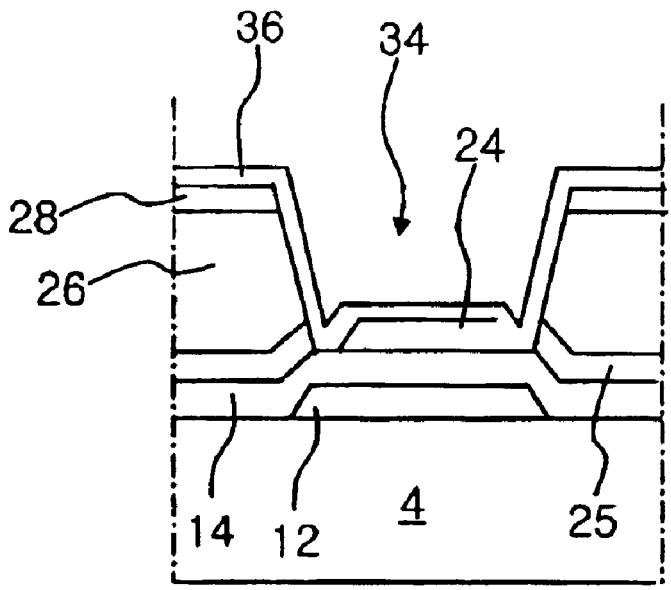
Figure 4:
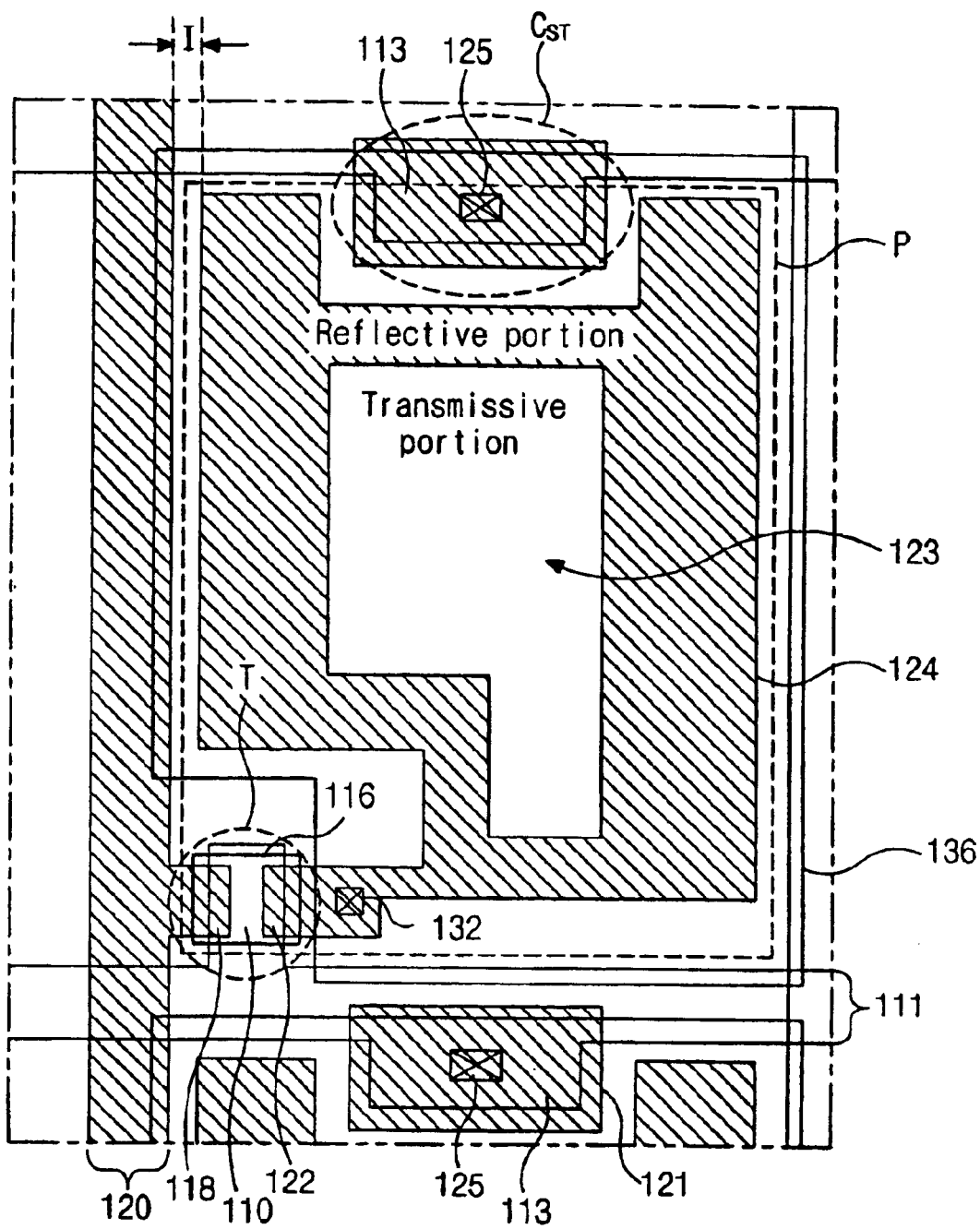
FIG. 4 is a schematic plane view of a liquid crystal display device according to an embodiment of the present invention.

FIG. 4 is a schematic plane view of a liquid crystal display device according to an embodiment of the present invention.

In FIG. 4, a gate line 111 and a data line 120 are formed to cross each other and define a pixel region "P." A gate electrode 110 extends from the gate line 111. A semiconductor layer 116 is formed over the gate electrode 110. Source and drain electrodes 118 and 122 are spaced apart from each other and overlap the gate electrode 110 and the semiconductor layer 116. The source electrode 118 extends from the data line 120. The gate electrode 110, the semiconductor layer 116 and the source and drain electrodes 118 and 122 constitute a thin film transistor (TFT) "T." A reflective layer 124 having a transmissive hole 123 is formed in the pixel region "P" at the same layer as the data line 120. A pixel electrode 136 connected to the drain electrode 122 through a drain contact hole 132 is formed in the pixel region "P." The pixel region "P" includes a transmissive portion corresponding to the transmissive hole 123 and a reflective portion corresponding to the reflective layer 124. The data line 120, and the source and drain electrodes 118 and 122 have multiple layers whose top layer is made of a metallic material having a high reflectance. Accordingly, the reflective layer 124 can be simultaneously formed with the data line 120, and the source and drain electrodes 118 and 122, which results in a reduced number of the mask processes.

Since the data line 120 has the same layer as the reflective layer 124, the data line 120 and the reflective layer 124 are spaced apart from each other by a distance of about 5 μm to about 7 μm to prevent an electrical short therebetween. Moreover, a first capacitor electrode 113 extends from the gate line 111 and a second capacitor electrode 121 is formed over the first capacitor electrode 113. The second capacitor electrode 121 may be formed at the same layer as the data line 120, and a first insulating layer (not shown) is interposed between the first and second capacitor electrodes 113 and 121. The pixel electrode 136 is connected to the second capacitor electrode through a capacitor contact hole 125 in a second insulating layer (not shown). Accordingly, the first and second capacitor electrodes 113 and 121, and the first insulating layer constitute a storage capacitor "$C_{ST}$" connected to the TFT "T."

FIGS. 5A to 5G are schematic cross-sectional views showing a fabricating process of a display region of an array substrate for a transflective liquid crystal display device according to an embodiment of the present invention, and FIGS. 6A to 6G are schematic cross-sectional views showing a fabricating process of a non-display region of an array substrate for a transflective liquid crystal display device according to an embodiment of the present invention.

Figure 5A:
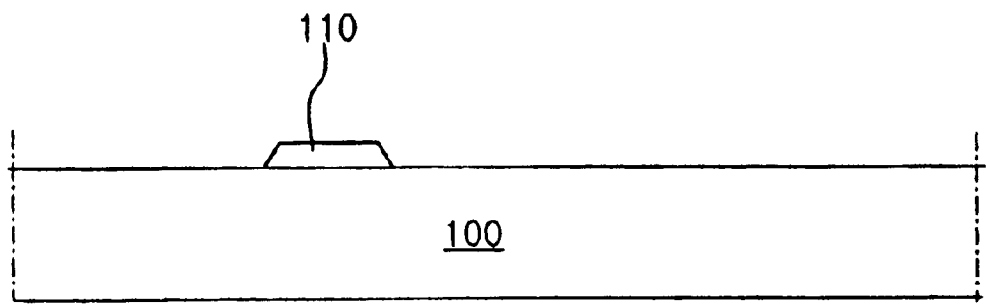
FIGS. 5A to 5E are schematic cross-sectional views showing a fabricating process of a display region of an array substrate for a transflective liquid crystal display device according to an embodiment of the present invention.
Figure 6A:
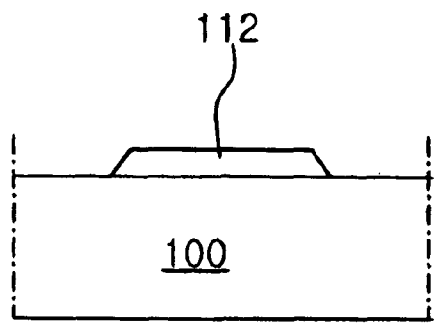
FIGS. 6A to 6E are schematic cross-sectional views showing a fabricating process of a non-display region of an array substrate for a transflective liquid crystal display device according to an embodiment of the present invention.

In FIGS. 5A and 6A, a gate electrode 110 and a first align key 112 of a first metallic material are formed on a substrate 100 through a first mask process.

Figure 5B:
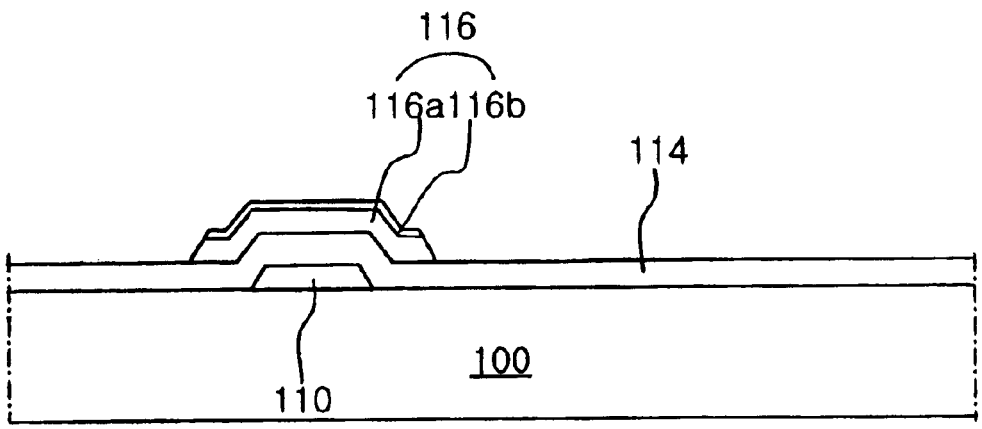
Figure 6B:
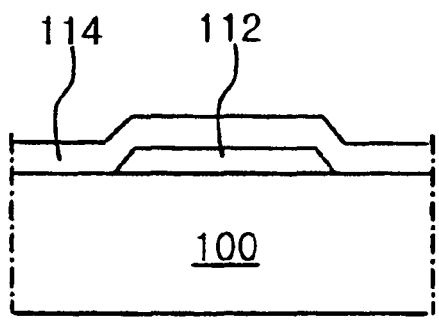

In FIGS. 5B and 6B, after a gate insulating layer 114 of a first insulating material is formed on the gate electrode 110 and the first align key 112, a semiconductor layer 116 including an active layer 116a of amorphous silicon (a-Si) and an ohmic contact layer 116b of impurity-doped amorphous silicon (n+ a-Si) is formed on the gate insulating layer 114 over the gate electrode 110 through a second mask process. The first insulating material can be made of a silicon insulating material such as silicon nitride (SiNx).

Figure 5C:
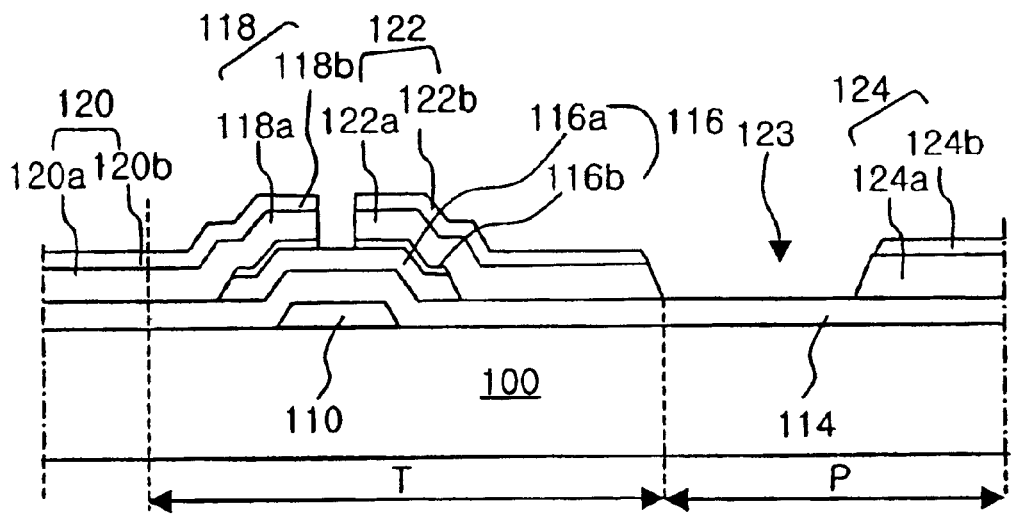
Figure 6C:
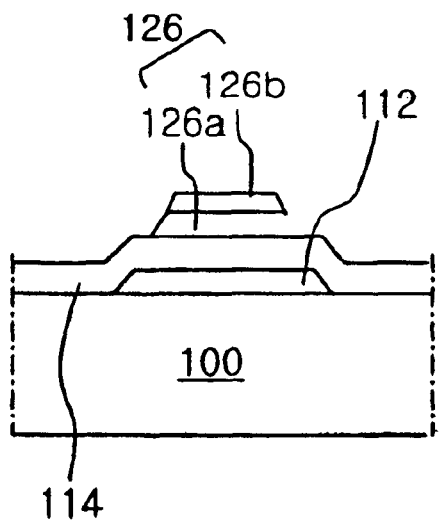

In FIGS. 5C and 6C, source and drain electrodes 118 and 122 of a second metallic material are formed on the semiconductor layer 116 through a third mask process. The source and drain electrodes 118 and 122 are spaced apart from each other. At the same time, a data line 120 connected to the source electrode 118, a reflective layer 124 and a second align key 126 are formed on the gate insulating layer 114. Thus, the data line 120, the reflective layer 124 and the second align key 126 have the same layer as the source and drain electrodes 118 and 122. The reflective layer 124 is disposed in the pixel region "P" and the second align key 126 corresponds to the first align key 112. The gate electrode 110, the semiconductor layer 116, and source and drain electrodes 118 and 122 constitute a thin film transistor (TFT) "T."

The data line 120 can have multiple layers in which a top layer includes a metallic material having a high reflectance, and a bottom layer includes a metallic material having a high chemical corrosion resistance. For example, the top layer can include one of aluminum (Al) and aluminum (Al) alloy such as aluminum neodymium (AlNd) and the bottom layer can include one of molybdenum (Mo), tungsten (W), nickel (Ni) and titanium (Ti). Therefore, the source electrode 118 includes first and second sub-source electrodes 118a and 118b. Similarly, the drain electrode 122 includes first and second sub-drain electrodes 122a and 122b, the data line 120 includes first and second sub-data lines 120a and 120b, the reflective layer 124 includes first and second sub-reflective layers 124a and 124b, and the second align key 126 includes first and second sub-second align keys 126a and 126b. Since the second sub-reflective layer 124b is made of a metallic material having a high reflectance, the reflective layer 124 can be simultaneously formed with the source and drain electrodes 118 and 122 and the data line 120 through the third mask process.

Figure 5D:
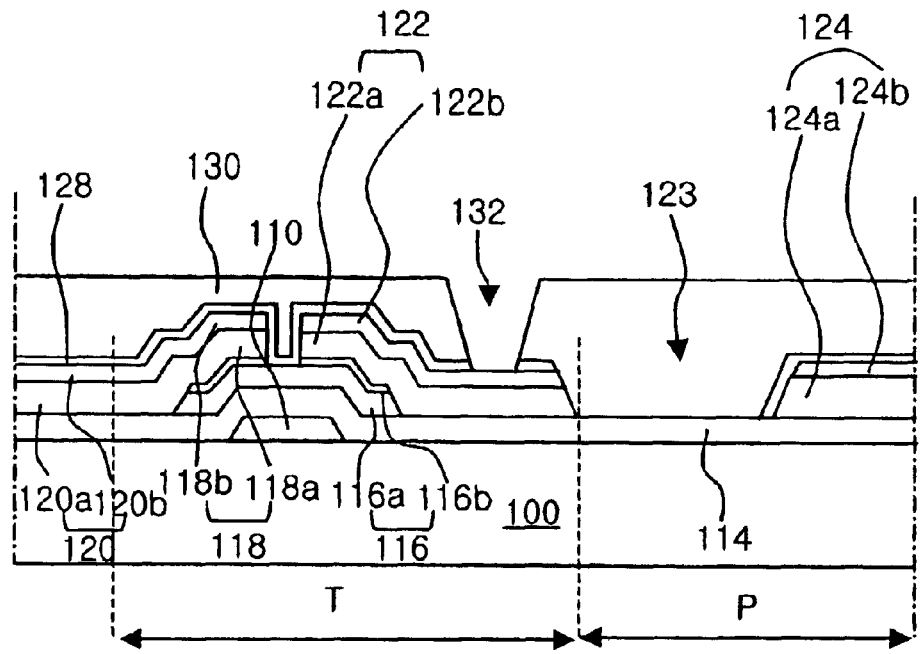
Figure 6D:
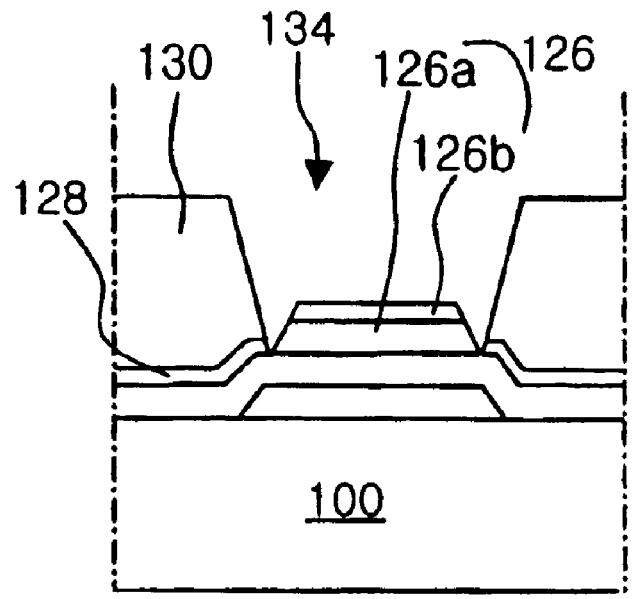

In FIGS. 5D and 6D, after first and second passivation layers 128 and 130 are sequentially formed on the TFT "T" and the second align key 126, a drain contact hole 132 exposing the drain electrode 122 and an open portion 134 exposing the second align key 126 are formed in the first and second passivation layers 128 and 130 through a fourth mask process. The first passivation layer 128 includes one of an inorganic insulating material group and the second passivation layer 130 includes one of an organic insulating material group having a low dielectric constant. For example, the first and second passivation layers 128 and 130 can be made of a silicon insulating material and benzocyclobutene (BCB), respectively. The open portion is formed through an additional mask process in the related art. In this embodiment, however, since the reflective layer 124 is simultaneously formed with the source and drain electrodes 118 and 122 through the third mask process, the open portion 134 can be formed through the fourth mask process of forming the drain contact hole 132. Accordingly, the additional mask process of forming the open portion can be omitted.

Figure 5E:
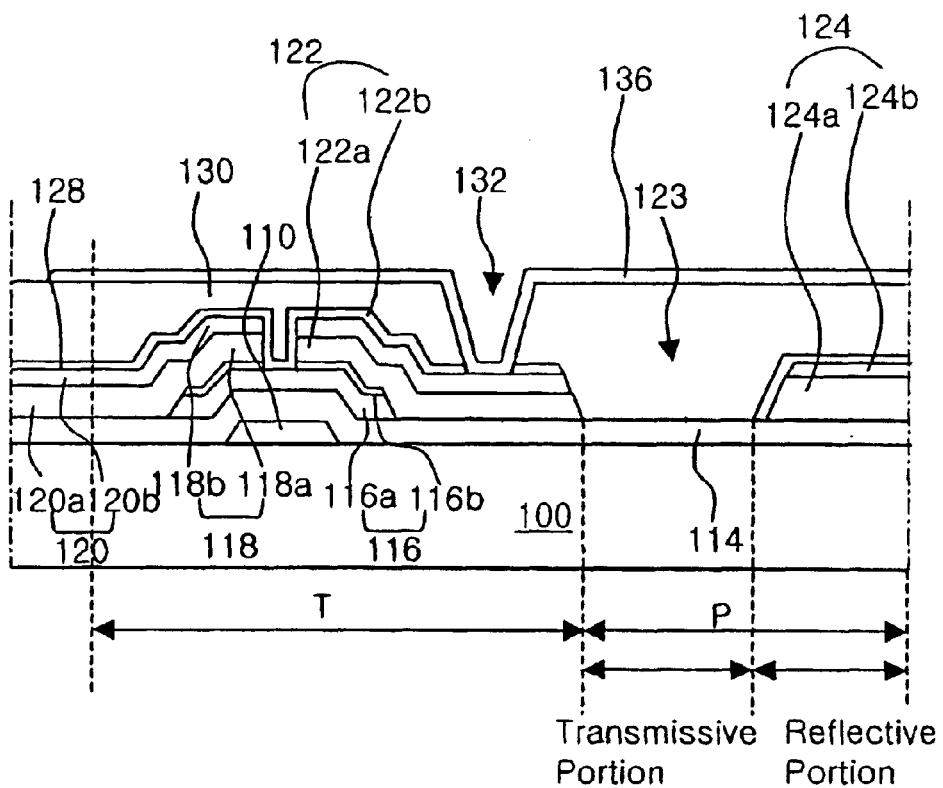
Figure 6E:
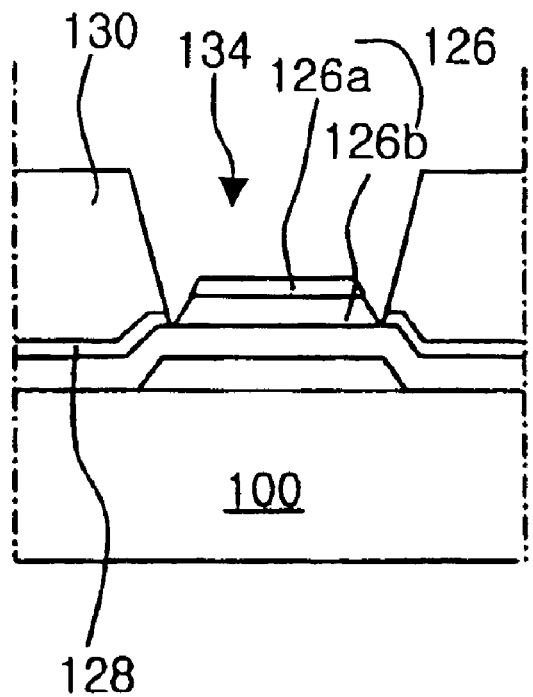

In FIGS. 5E and 6E, a pixel electrode 136 of a transparent conductive material is formed on the second passivation layer 130 in a pixel region "P" through a fifth mask process. The pixel electrode 136 is connected to the drain electrode 122 through the drain contact hole 132. The pixel region "P" includes a reflective portion corresponding to the reflective layer 124 and a transmissive portion corresponding to the transmissive hole 123. Images are displayed by using an ambient light in the reflective portion, while images are displayed by using light from the backlight unit (not shown) in the transmissive portion.

Consequently, since a reflective layer, a data line, source and drain electrodes and an align key are simultaneously formed to have multiple layers whose top layer includes a metallic material having a high reflectance, an additional mask process for the align key can be eliminated. Therefore, a high production yield and a low production cost can be obtained.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating an array substrate for a transflective liquid crystal display device, comprising:

forming a gate electrode and a gate line on a substrate through a first mask process;

forming a first insulating layer on the gate electrode and the gate line;

forming a semiconductor layer on the first insulating layer over the gate electrode through a second mask process;

forming source and drain electrodes on the semiconductor layer, a data line crossing the gate line, and a reflective layer on the first insulating layer through a third mask process, the source and drain electrodes being spaced apart from each other, the source electrode being connected to the data line, the gate line and the data line defining a pixel region having a transmissive portion and a reflective portion, the reflective layer being disposed in the pixel region and having a transmissive hole corresponding to the transmissive portion, the source and drain electrodes, the data line and the reflective layer having multiple layers of metal, a top layer of the multiple layers including a reflective metallic material;

forming second insulating layer on the source and drain electrodes, the data line and the reflective layer through a fourth mask process, the second insulating layer having a drain contact hole exposing the drain electrode; and forming a pixel electrode on the third insulating layer through a fifth mask process, the pixel electrode including a transparent conductive material, the pixel electrode being connected to the drain electrode through the drain contact hole.

2. The method according to claim 1, further comprising:

forming a first align key in a non-display region of the substrate through the third mask process; and forming the second insulating layer on the first align key through the fourth mask process, the second insulating layer having an open portion exposing the first align key.

3. The method according to claim 2, further comprising forming a second align key on the substrate through the first mask process, wherein the second align key corresponds to the first align key.

4. The method according to claim 1, wherein the data line and the reflective layer are spaced apart from each other by a distance of about 5 $\mu$m to about 7 $\mu$m.

5. The method according to claim 1, further comprising forming first and second capacitor electrodes, wherein the first capacitor electrode is formed on the substrate through the first mask process, wherein the second capacitor electrode is formed on the first insulating layer through the third mask process and overlaps the first capacitor electrode.

6. The method according to claim 5, further comprising forming a capacitor contact hole in the second insulating layer through the fourth mask process, wherein the capacitor contact hole exposes the second capacitor electrode, the pixel electrode is connected to the second capacitor electrode through the capacitor contact hole.

7. A method of fabricating an array substrate for a transflective liquid crystal display device, comprising:

forming a gate electrode and a gate line on a substrate;

forming a first insulating layer on the gate electrode and the gate line;

forming a semiconductor layer on the first insulating layer, the semiconductor layer having an active layer and an ohmic contact layer;

forming source and drain electrodes, a data line and a reflective layer having multiple layers on the first insulating layer at the same time, wherein the gate line and the data line define a pixel region having a transmissive portion and a reflective portion; and forming a pixel electrode of a transparent conductive material electrically connected to the drain electrode.

8. The method according to claim 7, further comprising forming an first align key at the same time as the source and drain electrodes, the data line and the reflective layer on the first insulating layer.

9. The method according to claim 8, further comprising forming a second align key at the same time as the gate electrode and the gate line, wherein the second align key corresponds to the first align key.

10. The method according to claim 7, further comprising:

forming second insulating layer on the source and drain electrodes, the data line and the reflective layer, the second insulating layer having a drain contact hole exposing the drain electrode.

11. The method according to claim 10, wherein the pixel electrode is electrically connected to the drain electrode through the drain contact hole.

12. The method according to claim 7, wherein the data line and the reflective layer are spaced apart such that the data line and the reflective layer are electrically insulated.

13. The method according to claim 7, wherein the top layer of the reflective layer is of high reflectance and the bottom layer of the reflective layer is of high chemical corrosion resistance.

* * * * *